United States Patent [19]

Dupon et al.

[11] Patent Number: 5,070,050

[45] Date of Patent: Dec. 3, 1991

[54] METAL OXIDE DIELECTRIC DENSE BODIES, PRECURSOR POWDERS THEREFOR, AND METHODS FOR PREPARING SAME

[75] Inventors: Ryan W. Dupon; Mark S. Thompson, both of San Carlos; Gary H. Wiseman, San Francisco; Douglas J. Musolf, Mountain View; Adam C. Tanous, Woodside, all of Calif.

[73] Assignee: Raychem Corporation, Menlo Park, Calif.

[21] Appl. No.: 483,597

[22] Filed: Feb. 22, 1990

Related U.S. Application Data

[63] Continuation-in-part of Ser. No. 258,272, Oct. 14, 1988, abandoned, and a continuation-in-part of Ser. No. 258,277, Oct. 14, 1988, abandoned, and a continuation-in-part of Ser. No. 258,278, Oct. 14, 1988, abandoned.

[51] Int. Cl.$^5$ ............... C04B 35/04; C04B 35/14; C04B 35/18; C04B 35/20
[52] U.S. Cl. ................... 501/108; 501/118; 501/119; 501/121; 501/122; 501/128; 501/133; 501/153; 501/154
[58] Field of Search ............ 501/108, 118, 119, 121, 501/122, 128, 133, 153, 154

[56] References Cited

U.S. PATENT DOCUMENTS

| | | | |
|---|---|---|---|
| 2,642,532 | 6/1953 | Hicks | 501/108 |
| 2,748,007 | 5/1956 | Badger et al. | 501/128 |
| 3,275,493 | 2/1966 | McDowell | 501/9 |
| 3,514,270 | 5/1970 | Tomita . | |
| 3,826,813 | 7/1974 | Gardner | 501/128 |
| 3,926,648 | 12/1975 | Miller | 501/9 |
| 3,940,255 | 2/1976 | Harrington et al. | 501/9 |
| 4,234,367 | 11/1980 | Herron et al. | 264/65 |
| 4,268,311 | 5/1981 | Verdow | 501/154 |
| 4,301,324 | 11/1981 | Kumar et al. | 501/7 |
| 4,418,025 | 11/1983 | Prochazka et al. | 501/154 |
| 4,745,092 | 5/1988 | Prunier, Jr. | 501/119 |

FOREIGN PATENT DOCUMENTS

| | | |
|---|---|---|
| 27825A1 | 5/1981 | European Pat. Off. . |
| 211603A1 | 2/1987 | European Pat. Off. . |
| 213010A1 | 3/1987 | European Pat. Off. . |
| 261744A2 | 3/1988 | European Pat. Off. . |
| 45-011221 | 4/1970 | Japan . |
| 58-120576 | 7/1983 | Japan . |
| 60-112643 | 6/1985 | Japan . |
| 2024790 | 1/1980 | United Kingdom . |

OTHER PUBLICATIONS

DeJonghe et al, J. Am. Ceram. Soc 71, C-356 (1988).

*Primary Examiner*—William R. Dixon, Jr.
*Assistant Examiner*—Anthony J. Green
*Attorney, Agent, or Firm*—Herbert C. Burkard; Yuan Chao

[57] ABSTRACT

A metal oxide dielectric dense body, comprising (I) grains having a predominant crystalline phase (a) a primary metal oxide selected from the group consisting of silicon and magnesium oxide and (b) optionally a secondary metal oxide selected from the group consisting of aluminum and zinc oxide and (II) between about 1 and about 20 atom % bismuth, vanadium, or boron oxide or combinations thereof, discontinuously located at the boundaries of the crystalline grains or as inclusions in the crystalline grains, the atom %'s based on the total atoms of bismuth, vanadium, boron, silicon, magnesium, aluminum, and zinc. The dense body has a density which is at least 95% of theoretical.

12 Claims, No Drawings

19
METAL OXIDE DIELECTRIC DENSE BODIES, PRECURSOR POWDERS THEREFOR, AND METHODS FOR PREPARING SAME

CROSS-REFERENCE TO RELATED APPLICATIONS

This application is a continuation-in-part of application Nos. 07/258,272, 07/258,277, and 07/258,278, all filed Oct. 14, 1988, all now abandoned the disclosures of which are incorporated herein by reference.

BACKGROUND OF THE INVENTION

This invention relates to metal oxide dielectric dense bodies, precursor powders and methods therefor, and multilayer semiconductor substrates made of the same.

Multilayer packaging in the electronics industry involves the use of ceramic powders which are sintered (or fired) to form a dense insulating (or dielectric) substrate for attaching semiconductor chips, connector leads, capacitors, resistors, and other electronic components. The substrate is first prepared as unsintered (or "green") sheets, onto which a desired pattern of electrical conductors (or precursor compositions therefor) is deposited by spraying, dipping, screening, etc. Interconnection between the various layers can be achieved by vias or feedthrough holes punched into them. The vias are metallized by filling them with a metal paste which, during the sintering process, is transformed into a sintered dense metal interconnection of a conductor such as copper. Thus, by superimposing a plurality of green sheets and interconnecting them with vias and sintering, a multilayer dielectric structure having a desired conductor pattern within it is prepared.

A common substrate is alumina ($Al_2O_3$), which possesses a number of desirable characteristics, among which are high resistivity, high thermal conductivity, and good mechanical properties. However, alumina also possesses some limitations. Its dielectric constant is undesirably high, as is its thermal expansion coefficient. The high temperature required to sinter alumina powder into a dense body, approximately 1500° C., is incompatible with the use of a highly conductive and inexpensive conductor such as copper (mp 1083° C.). Instead, less conductive and/or more expensive conductors such as molybdenum or tungsten, having higher melting points, must be used.

An attractive alternative material to alumina is cordierite ($2MgO.2Al_2O_3.5SiO_2$), due in part to its low dielectric constant and thermal expansion coefficient. In a prior art preparation of dense cordierite, a mixture of the consitituents MgO, $Al_2O_3$, and $SiO_2$ is sintered at temperature in excess of 1300° C. This method suffers from the same limitation regarding compatibility with copper conductors as the alumina method. Cordierite may be sintered to near-theoretical density by the glass-ceramic method at a lower temperature, about 1000° C., which is compatible with the use of lower melting conductors such as copper, gold, or silver. In this method, a two-stage process is used. First, an appropriate composition (e.g., 13.78 wt. % MgO, 34.86 wt. % $Al_2O_3$, and 51.36 wt. % $SiO_2$) is prefired to a high temperature (about 1500° C.) and then rapidly quenched to form a glass. The glass may include nucleating agents such as titanium oxide, zirconium oxide, phosphorus pentoxide, or stannic oxide. Second, the glass, after forming into a green body of appropriate shape, is heated to about 1000° C. to form the dense body, with the nucleating agent helping to promote the crystallization of the glass. The ensuing dense body typically consists of fine grained crystals dispersed in a glassy matrix. Because copper conductor is applied after the first, higher temperature heating cycle this process is compatible with its use. Discussions of various aspects of glass-ceramic technology may be found in MacDowell, U.S. Pat. No. 3,275,493 (1966); Miller, U.S. Pat. No. 3,926,648 (1975); Kumar et al., U.S. Pat. No. 4,301,324 (1981); and Herron et al., U.S. Pat. No. 4,234,367 (1980). Prunier, Jr., in U.S. Pat. No. 4,745,092 (1988), discloses an alternative method of making cordierite having therein minor amounts of calcia from synthetic raw materials such as magnesium and aluminum salts and colloidal silica. However, his sintering temperatures are between 1380° and 1440° C., making his process incompatible with copper conductor.

Another alternative material to alumina is mullite ($3Al_2O_3.2SiO_2$), due in part to its low dielectric constant and thermal expansion coefficient. However, conventional preparation of mullite by sintering a mixture of the consitituents $Al_2O_3$ and $SiO_2$ requires a firing temperature in excess of 1350° C. and therefore suffers from the same limitation regarding suitable conductors as alumina. Gardner, U.S. Pat. No. 3,826,813 (1974), discloses a process for making mullite for use as an integrated circuit substrate by a two-step process, in which the precursor materials are prereacted at 1300°-1400° C. and later sintered at 1500°-1600° C.

Yet another alternative material to alumina is magnesium oxide (MgO), due in part to its high thermal conductivity, which leads to efficient heat dissipation. However, the conventional preparation of a magnesium oxide dense body by sintering magnesium oxide powder requires a firing temperature in excess of 1350° C. and therefore suffers from the same limitation regarding suitable conductors as alumina. De Jonghe et al., in J. Am. Ceram. Soc. 71, C-356 (1988), disclose another method of making magnesium oxide, by the liquid phase sintering of a magnesium oxide-bismuth oxide system. Bismuth oxide is added to an alcoholic suspension of magnesium oxide, and, after stir drying, the powder mixture is ground up with a mortar and pestle and sintered at about 1000° C. to produce the dense body. However, the densification obtained is relatively low—only about 70–80% of theoretical.

The present invention provides novel methods of making dielectric dense bodies comprising cordierite, mullite, magnesium oxide, or other metal oxides, which are compatible with the use of copper or other low melting conductor because of their lower preparation temperature. There are also provided novel metal oxide dielectric compositions made by the process of this invention.

SUMMARY OF THE INVENTION

This invention provides a metal oxide dielectric dense body, comprising (I) grains having a predominant crystalline phase comprising (a) a primary metal oxide selected from the group consisting of silicon and magnesium oxide and (b) optionally a secondary metal oxide selected from the group consisting of aluminum and zinc oxide and (II) between about 1 and about 20 atom % bismuth, vanadium, or boron oxide or combinations thereof, discontinuously located at the boundaries of the crystalline grains or as inclusions in the crystalline grains, the atom %'s based on the total atoms of bismuth, vanadium, boron, silicon, magnesium, aluminum, and zinc;

the dense body having a density which is at least 95% of theoretical.

This invention also provides a method of making a dielectric dense body containing silicon and/or magnesium oxide as a primary oxide and optionally aluminum or zinc oxide as a secondary oxide, comprising the steps of:

(a) forming an aqueous mixture containing
  (i) a source of primary oxide, selected from the group consisting of colloidal silica; high surface area silica; mixed oxides of silicon and aluminum; magnesium salts, oxides and hydroxides; and mixed oxides of magnesium and aluminum;
  (ii) optionally a source of secondary oxide, selected from the group consisting of aluminum salts, oxides, and hydroxides and zinc salts, oxides, and hydroxides;
  (iii) a sintering aid source selected from the group consisting of bismuth salts, oxides, and hydroxides; vanadium salts, oxides, and hydroxides; boric acid, borate salts, and boron oxide; and combinations thereof; the sintering aid source having a Bi plus V plus B atom % of between 1.0 and about 20, based on the total atoms of Mg, Si, Al, Zn, Bi, V, and B; and
  (iv) a precipitating agent in an amount sufficient to precipitate a precursor powder for the dielectric dense body;
(b) collecting and drying the precursor powder;
(c) forming the dried precursor powder into a green body having a desired shape; and
(d) sintering the green body at a temperature of at least 850° C. to form the dense body.

Another aspect of this invention provides a method of making a precursor powder for a dielectric dense body containing silicon and/or magnesium oxide as a primary oxide and optionally aluminum or zinc oxide as a secondary oxide, comprising the aforementioned steps (a) and (b).

In yet another aspect of our invention, there is provided a multilayer substrate for a semiconductor device, at least two layers thereof having thereon a conductor pattern and being electrically connected to each other by metallized vias, the substrate being made of a dielectric dense body of this invention.

DESCRIPTION OF PREFERRED EMBODIMENTS

Our invention enables the preparation of dielectric dense bodies by a sintering process at relatively low temperatures, so that copper conductors may be used in combination therewith. However, unlike the glass-ceramic process, the simpler present process requires only one heating cycle. A precursor powder containing a combination of primary metal oxides and optionally secondary metal oxides in the desired stoichiometry and further containing a sintering aid dispersed therein is sintered.

The sintering aid is preferably bismuth oxide ($Bi_2O_3$), vanadium oxide ($V_2O_5$), or boron oxide ($B_2O_3$), or combinations thereof. The corresponding hydroxides are also suitable, as they are converted to the oxides under the sintering conditions of this invention or during pre-sintering processing steps such as drying. Peritectic compositions may also be used. Exemplary peritectic compositions are $55Bi_2O_3.45B_2O_3$ and $81Bi_2O_3.19B_2O_3$. Boron sintering aid should be used in conjunction with a bismuth sintering aid, preferably in the form of a peritectic composition.

The sintering aid containing precursor powder is prepared by a precipitation process. By precipitation, we mean not only precipitation in the conventional sense, but also related processes such as occlusion, entrainment, metathesis, and the like.

In one embodiment, an acidic aqueous mixture, which may be a homogeneous solution or a colloidal or other heterogeneous mixture and which contains sources of the primary metal oxide, the secondary metal oxide (if present), and the sintering aid, in the desired relative amounts, is prepared. A basic precipitating agent is added, so that particles of the primary and secondary metal oxide (if present) having the sintering aid dispersed therein or thereover are formed. (Alternatively, the sintering aid may be added to an aqueous mixture already containing the precipitating agent.) The particles should be of a size which allows substantial densification to take place upon sintering and preferably are submicron in average size.

In another embodiment, the sintering aid is preferentially coated on a metal oxide (usually a primary one), by initially withholding the other metal oxides. The sintering aid is first precipitated onto the primary oxide and only thereafter are the other metal oxide sources added, to complete the preparation of the precursor powder. For example, in the preparation of a mullite ($3Al_2O_3.2SiO_2$) dielectric dense body, the aluminum oxide source is at first withheld from the aqueous mixture. The sintering aid is precipitated onto the silicon oxide and then the aluminum oxide source is added, to prepare a precursor powder in which the sintering aid selectively coats the silicon oxide.

After precipitation, the precursor powder is collected, optionally washed, and dried. Washing is helpful for removing coprecipitated or entrained extraneous salts formed during the precipitation process. However, where such salts are heat volatilizable, as will be discussed hereinbelow, washing can be omitted.

Where boron oxide or hydroxide is used as a sintering aid, the boron species (e.g., borate) may be soluble in the supernatant liquid, in which case the precursor powder is preferably collected by evaporating off the supernatant, for example with a rotary evaporator. In such instances, the use of volatilizable salts is particularly preferred.

Optionally, the precursor powder may be ground to a desired mesh size. The powder is then formed into a green sheet or body. Any desired electrical conductor patterns may be deposited at this point. Also, vias or feedthrough holes may be formed and filled with metallic paste for their subsequent metallization. Sintering then produces the dense body dielectric substrate material containing the desired conductor pattern, plus any metallized vias.

Additives such as plasticizers, binders, solvents, dispersants, surfactants and the like normally are used in making the green body. Typical suitable plasticizers include glycols (e.g., polypropylene glycol), phthalate esters (e.g., dioctyl phthalate and benzyl butyl phthalate), and long chain carboxylic acids (e.g., oleic and stearic acid), and mixtures thereof. Exemplary binders are cellulose esters, long-chain thermoplastic polymers such as poly(vinyl butyral), poly(vinyl acetate), and poly(methyl methacrylate). Exemplary surfactants include amine salts of alkyl aryl sulfonates, alkyl ethers of poly(ethylene glycol) (e.g., ethyl ether of poly(ethylene glycol)), alkyl aryl polyether alcohols (e.g., ethylphenyl glycol), polyoxyethylene acetate, and the like. The method of use and the amounts of such additives are well known in the art. See, for example, Eggerding et al., U.S. Pat. No. 4,540,621 and U.S. Pat. No. 4,235,855, the disclosures of which are incorporated by reference. Preferred additives are those which volatilize during the sintering process. Alternatively, the additives may be removed by a solvent extraction or leaching process.

In preparing the green body, a volatile solvent such as methanol generally is used. The solvent dissolves the binder (if any) and ensures that it individually and uniformly coats the precursor powder particles and helps control the rheology of the mixture so that it can be conveniently cast into the desired shape. The green body is cast into thin sheets by a conventional technique such as doctor-blading. The sheets are cut to the desired shape and via holes in the appropriate configuration are punched into them. A metallizing paste of gold, silver, or copper is extruded into the via holes by screen printing. Also, any desired conductor patterns are screen printed onto each sheet. The sheets are then stacked on top of each other, making sure that they are properly registered, and laminated. Sintering then produces a multilayer dielectric dense body, having conductor patterns on each layer and the various layers interconnected by metallized vias.

Additionally, the dielectrics of this invention may be used as insulators in other applications, and as structural ceramics.

While we do not wish to be bound by any theory, it is our belief that the sintering aid, when heated to a temperature above its melting point, melts and acts as reactive liquid phase sintering agent. It dissolves the precursor powder components and reprecipitates them as the crystalline dense body material at the grain boundaries, causing coalescence of powder particles. The precipitation method of our invention distributes the sintering aid homogeneously over the surfaces of the powder particles, enabling a more effective sintering process.

An advantage of our invention is that sintering or firing of the precursor powder can be effected at a relatively low temperature. The temperature should be at least 925° C., preferably is between about 925° and about 1050° C., and more preferably is between about 950° and about 1000° C. Such temperatures are compatible with the use of relatively low melting conductors such as copper, gold, or silver. The sintering time is not particularly critical, provided it is of sufficient duration. Typically, times of between about 2 and about 12 hr are sufficient. Longer times of course may be used, but are not required. There may be some variation in the time required, depending on the sintering temperature, the particle size of the precursor powder, the nature of the primary and secondary metal oxide sources, the amount of sintering aid present, etc., as may be readily empirically determined. As is well known in the art, the sintering process may be according to a complex heating schedule, in which the green body is heated initially for A hours at B °C., then for C hours at D °C., and so forth. Where the green body includes one or more volatilizable additives, it is desirable that they be removed before the final densification. In such instances, a complex heating schedule, with the initial heating stages at a lower temperature, for example at 200° to 700° C. for 1–60 hr, is recommended to volatilize the additives. A vacuum may be applied.

Where the primary metal oxide is silicon oxide (or silica), the source therefor is selected from the group consisting of colloidal silica, high surface area silica, mixed oxides of aluminum and silicon, mixed oxides of magnesium and silicon, and combinations thereof. Of course a mixed oxide should be used only if it is desired that the final composition contain an oxide of the other metal. Colloidal silica or silicon oxide is available under the tradename Ludox from Du Pont, with the grade AS being particularly preferred. Colloidal silica is also available under the tradename Cab-O-Sil from Cabot. The high surface area silica should have a surface area at least 10 square meters per gram. Preferably, the surface area is at least 30 square meters per gram. Suitable mixed aluminum-silicon oxides are clay ($Al_2O_3.2SiO_2$) and other aluminosilicates, while suitable mixed magnesium-silicon oxide are talc ($3MgO.4SiO_2$) and other magnesium silicates.

Suitable sources of the primary oxide magnesium oxide and the secondary oxides aluminum oxide (or alumina) and zinc oxide are the respective salts, oxides and hydroxide, and mixed oxides (e.g. spinel ($MgO.Al_2O_3$ or other magnesium aluminates); clay ($Al_2O_3.2SiO_2$)), and combinations thereof. Again, a mixed oxide should be used only if it is desired that the final composition contain an oxide of the other metal. Examples of suitable salts include the chlorides, bromides, oxalates, nitrates, sulfates, and mixtures thereof. The nitrates are preferred because the nitrate anion can form a volatilizable salt reaction by-product which can be readily removed by heating, as for example during the sintering process. This is particularly so if the precipitating agent has a volatizable cation, e.g., ammonium, so that a volatile salt (in this case, ammonium nitrate) is formed during the precipitation process. Where non-volatilizable salts are formed, they may still be used, provided that effective washing is performed to remove them prior to sintering.

The primary and secondary metal oxide sources are used in proportions which reflect the final desired composition. For example, if a willemite ($2ZnO.SiO_2$) dense body is being made, the primary metal oxide source and the secondary metal oxide source should be used in a molar ratio of approximately 1:2.

The sintering aid source is selected from the group consisting the respective salts, oxides, and hydroxides of bismuth, vanadium, and boron and combinations thereof. Examples of suitable salts include the chlorides, bromides, oxalates, nitrates, sulfates, and mixtures thereof. Boron is preferably added as boric acid, a borate salt, or boron oxide. The nitrates are preferred for the aforementioned reasons. Upon contact with the precipitating agent, the bismuth and/or vanadium sintering aid is precipitated as the corresponding oxide or hydroxide.

Preferably, the amount of sintering aid source (and thus sintering aid) to use is between about 1 and about 20 atom % bismuth plus vanadium plus boron, more preferably between about 2 and about 20 atom %. If vanadium oxide is the sole sintering aid the amount is preferably at least 5 atom %. Further, as discussed hereinbelow or as may readily be determined empirically, within the above preferred range there may be a particularly preferred range for a particular primary and secondary oxides.

Throughout this application, the atom % of an element X, where X is Si, Mg, Al, Zn, Bi, V, or B, is based on the total atoms of Si, Mg, Al, Zn, Bi, V and B:

$$\text{atom \%} \, X = \frac{\text{atoms }(X)}{\text{atoms (Si + Mg + Al + Zn + Bi + V + B)}} \times 100$$

Where a mixed oxide is used, it is to be understood that it serves as a dual source, that is, it supplies more than one element. For example, spinel ($MgO.Al_2O_3$) supplies two atoms of Al for each atom of Mg. Similarly, talc ($3MgO.4SiO_2$) is a dual source of magnesium (3 atoms) and silicon (4 atoms). For illustration, a mixture of one mole spinel and one mole talc would contain 40 atom % Mg, 20 atom % Al, and 40 atom % Si.

Suitable precipitating agents are bases such as sodium, potassium, and ammonium hydroxide and organic amines (e.g., methylamine, ethylamine, ethanolamine). Ammonium hydroxide and organic amines are preferred for their ability to form volatilizable salts in combination with anions such as nitrates. Ammonium hydroxide is particularly preferred. The amount of precipitating agent is not critical, provided it is sufficient to at least neutralize the initially acidic mixture and preferably render it alkaline. Where the Al or Mg source is a mixed oxide such as spinel, neutralization is sufficient. Where the Al or Mg source is a salt such as the nitrate, the mixture is preferably made alkaline, to a minimum pH of about 9–10.

The metal oxide dielectric dense bodies of this invention comprise grains having a predominant crystalline phase containing the primary metal oxide and optionally the secondary metal oxide. Where both primary and the secondary oxides are present, the two form a complex oxide, such as cordierite, mullite, or willemite. The dense bodies further comprise bismuth, vanadium, or boron oxide or combinations thereof located discontinuously at the boundaries between the grains or as inclusions within the grains. The grains preferably have an average particle size between about 0.1 and about 100 microns, more preferably between about 10 and about 100 microns. The density of the dense body is preferably at least 95%, more preferably at least 98%, of the theoretical density, which is based on the weighted average of the densities of pure primary and secondary oxide crystalline phase and any sintering aid present. For example, a dense body containing 2 atom % Bi as bismuth oxide (density 8.9 g/cc) and the balance aluminum, magnesium, and silicon oxides as cordierite (density 2.5 g/cc) has 8.206 weight percent bismuth oxide and 91.794 weight percent cordierite. The theoretical density TD for this dense body is given by:

$$TD = \frac{1}{(0.08206/8.9) + (0.91794/2.5)} = 2.657$$

Within the crystalline grains, substantial deviation from the theoretical stoichiometry for a particular mineral (e.g., cordierite, mullite, etc.) is permissible. For example, though cordierite has the empirical formula $2MgO.2Al_2O_3.5SiO_2$, the crystalline phase grains need not comprise magnesium, aluminum, and silicon oxides in the exact molar ratios 2:2:5. Table I provides exemplary crystalline metal oxide dense bodies which may be prepared according to this invention and the preferred and more preferred molar ratios of primary and secondary oxides therein. Table I further provides the preferred and more preferred amounts of bismuth, vanadium, or boron oxide or combinations thereof, to be used in the preparation of the respective compositions. While there may be some loss of the bismuth, vanadium or boron oxide sintering aid during the sintering process, the final amount of these materials in the dense bodies is not substantially different from the pre-sintering amounts.

TABLE I

| | | EXAMPLES OF COMPOSITIONS OF THIS INVENTION | | | |
|---|---|---|---|---|---|
| Predominat Crystalline Phase in Grains | Theoretical Empirical Formula | Molar Ratio | | Sintering Aid (Atom %) | |
| | | Preferred | More Preferred | Preferred | More Pref. |
| Cordierite | $2MgO.2Al_2O_3.5SiO_2$ | $MgO/Al_2O_3/SiO_2 =$ 2/1.0–3.0/4.0–6.0 | $MgO/Al_2O_3/SiO_2 =$ 2/1.8–2.2/4.8–5.2 | 1.2–20 | 2–20 |
| Magnesium Oxide | MgO | n/a | n/a | 2–20 | 2–20 |
| Mullite | $3Al_2O_3.2SiO_2$ | $Al_2O_3/SiO_2 =$ 3/1.0–3.0 | $Al_2O_3/SiO_2 =$ 3/1.8–2.2 | 5–20 | — |
| Mullite-silica | $3Al_2O_3.2SiO_2 + SiO_2$ | $Al_2O_3/SiO_2 =$ 3/1.0–3.0 in the mullite; mullite/silica molar ratio 1/3.0–5.0 | $Al_2O_3/SiO_2$ 3/1.8–2.2 in the mullite; mullite/silica molar ratio 1/3.5–4.5 | 1–20 | 2–20 |
| Willemite | $2ZnO.SiO_2$ | $ZnO/SiO_2 =$ 2/0.5–1.5 | $ZnO/SiO_2 =$ 2/0.8–1.2 | 1–20 | 2–20 |
| Silica | $SiO_2$ | n/a | n/a | 1–20 | 2–20 |

The crystalline phase in the grains preferably predominantly comprises one of the crystalline forms listed in Table I, namely cordierite, magnesium oxide, mullite, mullite-silica, willemite, or silica. More preferably, the sole detectable crystalline phase (as determined by X-ray crystallography) is one of the aforementioned ones.

While the dielectric dense bodies of this invention may include additional substances, it is preferred that they consist essentially of the aforementioned components, namely primary metal oxide, secondary metal oxide (if any), and sintering aid. Further, those skilled in the art will appreciate that some unavoidable impurities will necessarily be present, for example adventitious amounts of transition metals. The presence of alkali metals is preferably avoided.

The practice of our invention can be further understood from the following examples, which are provided by way of illustration and not of limitation.

EXAMPLE 1

This example illustrates the preparation of a cordierite dense body by the method of our invention, with a bismuth sintering aid, with spinel as a mixed oxide source for Mg and Al, and with the bismuth oxide sintering aid selectively coated onto the silicon oxide.

A bismuth stock solution was prepared by dissolving bismuth nitrate pentahydrate ($Bi(NO_3)_3.5H_2O$, 582 g) in concentrated nitric acid (384 mL) and then diluting with water to a final volume of 4 L.

Into a vessel were placed colloidal silica (Ludox (TM), 375.5 g, 44.5 atom % Si), 2000 mL deionized water, and 93 mL concentrated ammonium hydroxide. The resultant mixture was homogenized 5 min. using a Janke & Kunkel Ultra-Turrax mixing apparatus. To this mixture was added 373.7 mL of the above bismuth stock solution (2.0 atom % Bi), an action which resulted in the precipitation of the bismuth species onto the silica. The suspension was homogenized for 5 min. Finally, spinel (Baikowski S50CR, 142.3 g, 35.6 atom % Al and 17.8 atom % Mg) was added and the mixture homogenized for 20 min.

The thus obtained precursor material was collected by suction filtration, washed with water, and dried at 140° C. The dried powder was subsequently calcined to remove residual ammonium nitrate by heating according to the following schedule: 4.5 hr at 30°-300° C., then 1 hr at 300° C.

In order to more easily form green shapes from the calcined powder, polymeric binders were employed. Thus, 25 g of calcined precursor powder were combined with 150 mL isopropyl alcohol and 150 mL deionized water. The resultant was homogenized 20 min. To this were added 37.6 g of an aqueous solution containing 1.128 g Elvanol 51-05 PVA (DuPont) and 0.188 g Carbowax 8000 PEG (Union Carbide). The obtained slurry was evaporated to dryness, ground, sieved (106 micron mesh) and uniaxially pressed at about 6000 psi into a two inch diameter disc which was fired as follows: 43.5 hr at 50°-700° C., 0.5 hr at 700°-1000° C., and 12 hr at 1000° C.

Analysis of the X-ray diffraction pattern of the fired disc showed the presence of cordierite as the sole crystalline species. Density was determined to be 2.7 gm/cc, or 100 percent of theoretical.

EXAMPLE 2

This example illustrates the preparation of a cordierite dense body by the method of our invention, with a bismuth sintering aid, with Al and Mg salts as the sources of Al and Mg, and with the bismuth oxide sintering aid preferentially coated onto the silicon oxide by a sequential precipitation process.

A bismuth stock solution was prepared by dissolving bismuth nitrate pentahydrate (582 g) in concentrated nitric acid (384 mL) and then diluting with water to a final volume of 4 L.

Aluminum nitrate nonahydrate (112.54 g, 35.3 atom % Al) and magnesium nitrate hexahydrate (38.4 g, 17.6 atom % Mg) were dissolved in 150 mL deionized water.

In a separate container were placed colloidal silica (Ludox (TM), 56.3 g, 44.1 atom % Si), 150 mL deionized water, and 143.6 mL concentrated ammonium hydroxide. The resultant was homogenized 5 min. using a Janke & Kunkel Ultra-Turrax mixing apparatus. To this solution were added 85.0 mL of the above bismuth stock solution (3.0 atom % Bi), an action which resulted in the precipitation of the bismuth species. The suspension was homogenized for 5 min. Finally, the aqueous solution of aluminum nitrate and magnesium nitrate described above was added, precipitating the aluminum and magnesium from solution, and the mixture homogenized 5 min.

The thus obtained precursor material was collected by suction filtration, washed with water, and dried at 140° C. The dried powder was subsequently calcined to remove residual ammonium nitrate as follows: 4.5 hr at 30°-300° C., then 1 hr at 300° C.

The calcined powder was ground, sieved (106 micron mesh) and uniaxially pressed at 25,000 psi into a pellet which was fired as follows: 1.5 hr at 30°-1000° C., then 12 hr at 1000° C.

Analysis of the X-ray diffraction pattern of the fired pellet showed the presence of cordierite as the sole crystalline species. Linear shrinkage was measured as 23.7%. Density was determined to be 2.7 gm/cc, or 100 percent of theoretical.

EXAMPLE 3

This is a comparative example not according to the method of our invention, in which the preparation of a cordierite dense body is attempted without using any sintering aid.

Aluminum nitrate nonahydrate (112.54 g, 36.4 atom % Al) and magnesium nitrate hexahydrate (38.4 g, 18.2 atom % Mg) were dissolved in 150 mL deionized water.

In a separate container were placed colloidal silica (Ludox (TM), 56.3 g, 45.4 atom % Si), 150 mL deionized water, and 122.4 mL concentrated ammonium hydroxide. The resultant was homogenized 5 min. using a Janke & Kunkel Ultra-Turrax mixing apparatus. The aqueous solution of aluminum nitrate and magnesium nitrate described above was added, precipitating the aluminum and magnesium from solution, and the mixture homogenized 5 min.

The thus obtained precursor material was collected by suction filtration, washed with water, and dried at 140° C. The dried powder was subsequently calcined to remove residual ammonium nitrate as follows: 4.5 hr at 30°-300° C., then 1 hr at 300° C.

The calcined powder was ground, sieved (106 micron mesh) and uniaxially pressed at 25,000 psi into a pellet which was fired as follows: 1.5 hr at 30°-1000° C., 100 hr at 1000° C.

X-ray analysis of the fired pellet revealed no evidence of cordierite formation.

EXAMPLE 4

This example illustrates the preparation of a cordierite dense body by the method of our invention, with a bismuth sintering aid, in which the aluminum, magnesium and silicon oxides are precipitated simultaneously.

A bismuth stock solution was prepared by dissolving bismuth nitrate pentahydrate (196 g) in concentrated nitric acid (128 mL) and then diluting with water to a final volume of 4 L.

Aluminum nitrate nonahydrate (35.3 g, 35 atom % Al) and magnesium nitrate hexahydrate (17.6 g, 18 atom % Mg) were dissolved in 0.16N nitric acid (120 mL). To this solution were added colloidal silica (Ludox (TM), AS grade, 9 g, 44 atom % Si) and bismuth stock solution (40.8 mL, 3 atom % Bi). The precursor material was precipitated by the addition of concentrated aqueous ammonium hydroxide (20 mL). The resulting material was collected by suction filtration, washed thoroughly with water, and dried at 140° C. The dried powder was ground, sieved (106 micron mesh), and uniaxially pressed into a pellet which was fired at 1000° C. for 2 hr.

X-ray analysis of the diffraction pattern of the fired pellet showed the presence of cordierite as the sole crystalline species. Linear shrinkage as measured by dilatometry was 22%.

EXAMPLE 5

This example illustrates the preparation of a cordierite dense body by the method of our invention, with a bismuth sintering aid and with spinel as the raw material, and with the aluminum, magnesium, and silicon oxides precipitated simultaneously.

Spinel (Baikowski S50CR, 3.4 g, 35 atom % Al and 18 atom % Mg) and colloidal silica (Ludox (TM), 9.0 g, 44 atom % Si) were added to 0.16N nitric acid (120 mL). To this was added bismuth stock solution (40.8 mL, 3 atom % Bi) described in Example 4. The precursor material was precipitated by the addition of concentrated aqueous ammonium hydroxide (20 mL). The resulting material was collected by suction filtration, washed thoroughly with water, and dried at 140° C. The dried powder was ground, sieved (106 micron mesh), and uniaxially pressed into a pellet which was fired at 1000° C. for 2 hr.

X-ray analysis of the diffraction pattern of the fired pellet showed the presence of cordierite as the sole crystalline species. Linear shrinkage as measured by dilatometry was 22%.

EXAMPLE 6

This example illustrates the preparation of a cordierite dense body by the method of our invention, with a vanadium sintering aid, in which the aluminum, magnesium, and silicon oxides are precipitated simultaneously.

Magnesium nitrate hexahydrate (4.43 g, 16.5 atom % Mg), aluminum nitrate nonahydrate (12.9 g, 32.9 atom % Al), and colloidal silica (Ludox AS, 6.45 g, 41.0 atom % Si) were added to 0.17 N nitric acid (400 mL). To this solution was added vanadium oxide ($V_2O_5$, 0.91 g, 9.5 atom % V). Concentrated ammonium hydroxide (15 mL) was then added to precipitate the precursor material. The resulting material was collected by suction filtration and calcined at 300° C. for 1 hr. The resulting powder was ground and uniaxially pressed into a pellet which was sintered at 1000° C. for 12 hr.

X-ray diffraction analysis of the sintered pellet showed the presence of cordierite and vanadium oxide as the sole crystalline species.

EXAMPLE 7

This example illustrates the preparation of a mullite dense body by the method of our invention, with a bismuth sintering aid, and in which the sintering aid is preferentially deposited onto silica by sequential precipitation.

A bismuth stock solution was prepared by dissolving bismuth nitrate pentahydrate ($Bi(NO_3)_3 \cdot 5H_2O$, 582 g) in concentrated nitric acid (384 mL) and then diluting with deionized water to a final volume of 4 L.

Aluminum nitrate nonahydrate ($Al(NO_3)_3 \cdot 9H_2O$, 56.27 g, 71.25 atom % Al) was dissolved in 100 mL deionized water.

In a separate container were placed colloidal silica (Ludox (TM), 7.51 g, 23.75 atom % Si), 100 mL deionized water, and 54.64 mL concentrated ammonium hydroxide. The resultant mixture was homogenized 5 min. using a Janke & Kunkel Ultra-Turrax mixing apparatus. To these were added 35.09 mL of the above bismuth stock solution (5.0 atom % Bi), an action which resulted in the precipitation of the bismuth species onto the silica. The suspension was homogenized for 5 min. Next, the aqueous solution of aluminum nitrate described above was added, precipitating the aluminum from solution, and the mixture homogenized for another 5 min.

The thus obtained precursor material was collected by suction filtration, washed with water, and dried at 140° C. The dried powder was subsequently calcined to remove residual ammonium nitrate according to the following schedule: 4.5 hr at 30°–300° C. and then 1 hr at 300° C.

The calcined powder was ground, sieved (106 micron mesh) and uniaxially pressed at 25,000 psi into a pellet which was fired as follows: 1.5 hr at 30°–1000° C. and then 12 hr at 1000° C.

X-ray diffraction analysis of the fired pellet showed the presence of mullite as the sole crystalline species. Linear shrinkage was 22%. Density was determined to be 2.8 gm/cc, or 78 percent of theoretical.

EXAMPLE 8

This is a comparative example not according to the method of our invention, in which the preparation of a mullite dense body is attempted without using any sintering aid.

Aluminum nitrate nonahydrate ($Al(NO_3)_3 \cdot 9H_2O$, 56.27 g, 75.0 atom % Al) was dissolved in 100 mL deionized water.

In a separate container were placed colloidal silica (Ludox (TM), 7.51 g, 25.0 atom % Si), 100 mL deionized water, and 45.92 mL concentrated ammonium hydroxide. The resultant was homogenized 5 min. using a Janke & Kunkel Ultra-Turrax mixing apparatus. The aqueous solution of aluminum nitrate described above was added, precipitating the aluminum from solution, and the mixture homogenized for another 5 min.

The thus obtained precursor material was collected by suction filtration, washed with water, and dried at 140° C. The dried powder was subsequently calcined to remove residual ammonium nitrate as follows: 4.5 hr at 30°–300° C. and then 1 hr at 300° C.

The calcined powder was ground, sieved (106 micron mesh) and uniaxially pressed at 25,000 psi into a pellet which was fired as follows: 1.5 hr at 30°–1000° C. and 12 hr at 1000° C.

X-ray diffraction analysis of the fired pellet revealed no evidence of mullite formation.

EXAMPLE 9

This example illustrates the preparation of a mullite dense body by the method of our invention, with a bismuth sintering aid and simultaneous precipitation process.

A bismuth stock solution was prepared by dissolving bismuth nitrate pentahydrate (196 g) in concentrated nitric acid (128 mL) and then diluting with water to a final volume of 4 L.

Aluminum nitrate nonahydrate (11.04 g, 67.5 atom % Al) was dissolved in 0.2 N nitric acid (100 mL). To this solution were added colloidal silica (Ludox (TM), 1.47 g, 22.5 atom % Si) and 43.6 mL of the above bismuth stock solution (10 atom % Bi). Concentrated aqueous ammonium hydroxide (200 mL) was added to precipitate the precursor material, which was collected by suction filtration, washed thoroughly with water, and dried at 140° C. The dried powder was ground, sieved (106 micron mesh), and uniaxially pressed at 25,000 psi into a pellet which was fired at 1000° C. for 2 hr.

X-ray analysis of the diffraction pattern of the fired pellet showed the presence of mullite as the sole crystalline species. Linear shrinkage as measured by dilatometry was 17%.

EXAMPLE 10

This example illustrates the preparation of a mullite dense body by the method of our invention, with a vanadium sintering aid and a simultaneous precipitation process.

Aluminum nitrate nonahydrate (25.5 g, 67.5 atom % Al) and colloidal silica (Ludox AS, 3.3 g, 22.5 atom % Si) were added to 0.17N nitric acid (400 mL). To this solution was added vanadium oxide ($V_2O_5$, 0.91 g, 10 atom % V). Concentrated ammonium hydroxide was then added to precipitate the precursor material. The resulting material was collected by suction filtration and calcined at 300° C. for 1 hr. The resulting powder was ground and uniaxially pressed at 25,000 psi into a pellet which was sintered at 1000° C. for 12 hr.

X-ray diffraction analysis of the fired pellet showed the presence of mullite and vanadium oxide as the sole crystalline species.

EXAMPLE 11

This example illustrates the preparation of a magnesium oxide dense body by the method of our invention, with a bismuth sintering aid, and in which the sintering aid is deposited onto the magnesium oxide precursor by sequential precipitation.

A bismuth stock solution was prepared by dissolving bismuth nitrate pentahydrate ($Bi(NO_3)_3.5H_2O$, 582 g) in concentrated nitric acid (384 mL) and then diluting with deionized water to a final volume of 4 L.

Magnesium nitrate hexahydrate ($Mg(NO_3)2.6H_2O$, 25.1 g, 98 atom % Mg) was dissolved in 300 mL of 0.15N nitric acid solution. To this solution was added 13.4 mL of concentrated ammonium hydroxide, an action which resulted in the precipitation of the magnesium species. To these were added 6.6 mL of the above bismuth stock solution (2.0 atom % Bi), an action which resulted in the precipitation of the bismuth species onto the magnesium species.

The thus obtained precursor material was collected by suction filtration and calcined at 300° C. for 1 hr. The dried powder was ground and uniaxially pressed at 25,000 psi into a pellet which was sintered at 1000° C. for 12 hr.

X-ray diffraction analysis of the fired pellet showed the presence of magnesium oxide as the sole crystalline species. Linear shrinkage was 22%. Densities were determined to be at least 99% of theoretical (3.82 g/cc).

EXAMPLE 12

This example illustrates the preparation of a magnesium oxide dense body by the method of our invention with a vanadium sintering aid and simultaneous precipitation process.

Magnesium nitrate hexahydrate (23.0 g, 90 atom % Mg) was dissolved in 0.17N nitric acid solution (400 mL). To this solution was added vanadium oxide ($V_2O_5$, 0.91 g, 10 atom % V). Concentrated ammonium hydroxide was then added to precipitate the precursor material. The resulting material was collected by suction filtration and calcined at 300° C. for 1 hr. The resulting powder was ground and uniaxially pressed at 25,000 psi into a pellet which was sintered at 1000° C. for 12 hr. Linear shrinkage was 14%.

EXAMPLE 13

This example illustrates the preparation of a cordierite dense body according to this invention, using a peritectic composition of bismuth oxide-boron oxide (81:19 mole ratio of bismuth oxide:boron oxide) as a sintering aid, with spinel as a mixed oxide source for Mg and Al and with the bismuth oxide portion of the sintering aid selectively coated onto the silicon oxide.

A bismuth stock solution was prepared by dissolving bismuth nitrate pentahydrate ($Bi(NO_3)_3.5H_2O$, 582 g) in concentrated nitric acid (384 mL) and then diluting with water to a final volume of 4 L.

A boron stock solution was prepared by dissolving boric acid ($H_3BO_3$, 30.9 g) in 500 mL water and then diluting with water to a final volume of 1 L.

Into a beaker were placed colloidal silica (Ludox (TM), 37.55 g, 44.34 atom % Si), 100 mL deionized water, and 40 mL concentrated ammonium hydroxide. The resultant mixture was homogenized 5 min. using a Janke & Kunkel Ultra-Turrax mixing apparatus. To this mixture was added 5.30 mL of the above boron stock solution (0.47 atom % B) and 37.4 mL of the above bismuth stock solution (1.99 atom % Bi), an action which resulted in the precipitation of the bismuth species onto the silica. The suspension was homogenized for 5 min. Finally, spinel (Baikowski S50C14.23 g, 35.46 atom % Al and 17.74 atom % Mg) was added and the mixture homogenized for 10 min.

The thus obtained precursor material was stripped of free water using a Buchi Rotavapor-R rotary evaporating apparatus, and then dried at 140° C. The dried powder was subsequently calcined to remove ammonium nitrate by heating according to the following schedule: 4.5 hr at 30°-300° C., then 1 hr at 300° C.

The calcined powder was ground, sieved (<106 micron mesh) and uniaxially pressed at 10,000 psi into a pellet which was fired according to the following schedule: 1.5 hr at 30°-1000° C., then 12 hr at 1000° C.

Analysis of the X-ray diffraction pattern of the fired pellet showed the presence of cordierite as the sole crystalline species. Density was determined to be 2.6 g/cc, or 96% of theoretical.

EXAMPLE 14

This example illustrates the preparation of a cordierite dense body according to this invention using a peritectic composition of bismuth oxide-boron oxide (55:45 mole ratio of bismuth oxide:boron oxide) as a sintering aid, with spinel as a mixed oxide source for Mg and Al and with the bismuth oxide portion of the sintering aid selectively coated onto the silicon oxide.

A bismuth stock solution was prepared by dissolving bismuth nitrate pentahydrate ($Bi(NO_3)_3.5H_2O$, 582 g) in concentrated nitric acid (384 mL) and then diluting with water to a final volume of 4 L.

A boron stock solution was prepared by dissolving boric acid ($H_3BO_3$, 30.9 g) in 500 mL water and then diluting with water to a final volume of 1 L.

Into a beaker were placed colloidal silica (Ludox (TM), 37.55 g, 43.83 atom % Si), 200 mL deionized water, and 30 mL concentrated ammonium hydroxide. The resultant mixture was homogenized 5 min. using a Janke & Kunkel Ultra-Turrax mixing apparatus. To this mixture was added 18.37 mL of the above boron stock solution (1.61 atom % B) and 37.4 mL of the above bismuth stock solution (1.97 atom % Bi), an action which resulted in the precipitation of the bismuth speies onto the silica. The suspension was homogenized for 5 min. Finally, spinel (Baikowski S50CR, 14.23 g, 35.06 atom % Al and 17.53 atom % Mg) was added and the mixture homogenized for 10 min.

The thus obtained precursor material was stripped of free water using a Buchi Rotavapor-R rotary evaporating apparatus, and then dried at 140° C. The dried powder was subsequently calcined to remove ammonium nitrate by heating according to the following schedule: 4.5 hr at 30°-300° C., then 1 hr at 300° C.

The calcined powder was ground, sieved (<106 micron mesh) and uniaxially pressed at 10,000 psi into a pellet which was fired according to the following schedule: 1.5 hr at 30°-940° C., then 6 hr at 940° C.

Analysis of the X-ray diffraction pattern of the fired pellet showed the presence of cordierite as the sole crystalline species. Density was determined to be 2.6 g/cc, or 98% of theoretical.

EXAMPLE 15

This example illustrates the preparation of a mullite-silica dense body by the method of our invention with a bismuth sintering aid, with clay (kaolinite, $Al_2O_3 \cdot 2SiO_2$) as the mixed oxide source, and with the bismuth oxide sintering aid precipitated onto the clay.

A bismuth stock solution was prepared by dissolving bismuth nitrate pentahydrate ($Bi(NO_3)_3 \cdot 5H_2O$, 582 g) in concentrated nitric acid (384 mL) and then diluting with water to a final volume of 4 L.

A mill jar (U.S. Stoneware Roalox burundum-fortified, 0.3 gallon) was charged with 30 burundum cylinders (U.S. stoneware, 13/16×13/16), clay (R. T. Vanderbilt Peerless (TM) Clay 3, 125 g, 46.8 atom % Si and 48.2 atom % Al), and 300 mL deionized water. The mixture was ball-milled for 72 hr, after which the clay-water slurry was transferred and diluted with water to a volume of 1 L, giving a slurry composition of 0.125 g clay/mL slurry.

Into a vessel were placed 1 L of the above clay slurry, 1 L deionized water, and 200 mL concentrated ammonium hydroxide. The mixture was homogenized 15 min. using a Janke & Kunkel Ultra-Turrax mixing apparatus. Finally, 332.2 mL of the above bismuth stock solution (5.0 atom % Bi) were added to the mixture, which resulted in the precipitation of the bismuth species onto the clay. The resultant was homogenized for 10 min.

The thus obtained precursor material was collected by suction filtration and dried at 140° C. The dried powder was subsequently calcined to remove residual ammonium nitrate by heating according to the following schedule: 4.5 hr at 30°-300° C., then 1 hr at 300° C.

The calcined powder was ground, sieved (<106 micron mesh) and uniaxially pressed at 10,000 psi into a pellet which was fired according to the following schedule: 1.5 hr at 30°-1100° C., then 12 hr at 1100° C.

Analysis of the X-ray diffraction pattern of the fired pellet showed the presence of mullite and silica as the sole crystalline species. Density was determined to be 3.05 g/cc, or 97 percent of theoretical.

EXAMPLE 16

This is a comparative example not according to the method of our invention, in which the preparation of a mullite-silica dense body is attempted using clay as a mixed oxide source, without any sintering aid.

Clay (R. T. Vanderbilt Peerless Clay 3, 51.1 atom % Al, and 48.9 atom % Si) as the mixed oxide source was uniaxially pressed at 10,000 psi into a pellet which was fired according to the following schedule: 1.5 hr at 30°-1100° C., then 100 hr at 1100° C.

Analysis of the X-ray diffraction pattern of the fired pellet showed the presence of mullite and silica as the crystalline species. Density was determined to be 2.1 g/cc, or 77% of theoretical.

EXAMPLE 17

This example illustrates the preparation of a willemite dense body by the method of our invention, with a bismuth sintering aid selectively coated onto the silicon oxide.

A bismuth stock solution was prepared by dissolving bismuth nitrate pentahydrate ($Bi(NO_3)_3 \cdot 5H_2O$, 582 g) in concentrated nitric acid (384 mL) and then diluting with water to a final volume of 4 L.

Into a vessel were placed colloidal silica (Ludox (TM), 15.02 g, 32.3 atom % Si), 200 mL deionized water, and 7.7 mL concentrated ammonium hydroxide. The resultant mixture was homogenized 5 min. using a Janke & Kunkel Ultra-Turrax mixing apparatus. To this mixture was added 30.9 mL of the above bismuth stock solution (3.0 atom % Bi), an action which resulted in the precipitation of the bismuth species onto the silica. The mixture was homogenized for 5 min. Finally, zinc oxide (New Jersey Zinc Kadox (TM) 930, 16.27 g, 64.7 atom % Zn) was added and the mixture homogenized for 15 min.

The thus obtained precursor material was collected by suction filtration and dried at 140° C. The dried powder was subsequently calcined to remove residual ammonium nitrate by heating according to the following schedule: 4.5 hr at 30-300° C., then 1 hr at 300° C.

The calcined powder was ground, sieved (<106 micron mesh) and uniaxially pressed at 10,000 psi into a pellet which was fired according to the following schedule: 1.5 hr at 30°-1000° C., then 12 hr at 1000° C.

Analysis of the X-ray diffraction pattern showed the presence of willemite and a bismuth silicate ($Bi_2SiO_5$) as the only crystalline species. Density was determined to be 4.25 g/cc, or 98 percent of theoretical.

EXAMPLE 18

This example illustrates the preparation of a willemite dense body according to our invention using a peritectic composition of bismuth oxide-boron oxide (81:19 mole ratio of bismuth oxide:boron oxide) as a sintering aid, with the bismuth oxide portion of the sintering aid selectively coated onto the silicon oxide.

A bismuth stock solution was prepared by dissolving bismuth nitrate pentahydrate ($Bi(NO_3)_3 \cdot 5H_2O$, 582 g) in concentrated nitric acid (384 mL) and then diluting with water to a final volume of 4 L.

Into a beaker were placed colloidal silica (Ludox (TM), 22.53 g, 32.3 atom % Si), 200 mL deionized water, and 15 mL concentrated ammonium hydroxide. The resultant mixture was homogenized 5 min. using a Janke & Kunkel Ultra-Turrax mixing apparatus. To this mixture was added 0.172 g of boric acid ($H_3BO_3$, 0.6 atom % B), and 39.54 mL of the above bismuth stock solution (2.55 atom % Bi), an action which resulted in the precipitation of the bismuth species onto the silica. The suspension was homogenized for 5 min. Finally, zinc oxide (New Jersey Zinc Kadox (TM) 930, 24.41 g, 64.57 atom % Zn) was added and the mixture homogenized for 10 min.

The thus obtained precursor material was stripped of free water using a Buchi Rotavapor-R rotary evaporating apparatus, then dried at 140° C. The dried powder was subsequently calcined to remove ammonium nitrate by heating according to the following schedule: 4.5 hr at 30°-300° C., then 1 hr at 300° C.

The calcined powder was ground, sieved (<106 micron mesh) and uniaxially pressed at 10,000 psi into a pellet which was fired according to the following schedule: 1.5 hr at 30°-1000° C., then 12 hr at 1000° C.

Analysis of the X-ray diffraction pattern of the fired pellet showed the presence of willemite as the sole crystalline species. Density was determined to be 4.28 g/cc, or 100% of theoretical.

EXAMPLE 19

This example illustrates the preparation of a willemite dense body according to our invention, using a peritectic composition of bismuth oxide-boron oxide (55:45 mole ratio of bismuth oxide:boron oxide) as a sintering aid, with the bismuth oxide portion of the sintering aid selectively coated onto the silicon oxide.

A bismuth stock solution was prepared by dissolving bismuth nitrate pentahydrate ($Bi(NO_3)_3.5H_2O$, 582 g) in concentrated nitric acid (384 mL) and then diluting with water to a final volume of 4 L.

Into a beaker were placed colloidal silica (Ludox (TM), 22.53 g, 32.2 atom % Si), 200 mL deionized water, and 15 mL concentrated ammonium hydroxide. The resultant mixture was homogenized 5 min. using a Janke & Kunkel Ultra-Turrax mixing apparatus. To this mixture was added 0.44 g of boric acid ($H_3BO_3$, 1.53 atom % B), and 28.96 mL of the above bismuth stock solution (1.87 atom % Bi), an action which resulted in the precipitation of the bismuth species onto the silica. The suspension was homogenized for 5 min. Finally, zinc oxide (New Jersey Zinc Kadox (TM) 930, 24.41 g, 64.4 atom % Zn) was added and the mixture homogenized for 10 min.

The thus obtained precursor material was stripped of free water using a Buchi Rotavapor-R rotary evaporating apparatus, then dried at 140° C. The dried powder was subsequently calcined to remove ammonium nitrate by heating according to the following schedule: 4.5 hr at 30°-300° C., then 1 hr at 300° C.

The calcined powder was ground, sieved (<106 micron mesh) and uniaxially pressed at 10,000 psi into a pellet which was fired according to the following schedule: 1.5 hr at 30°-900° C., then 12 hr at 900° C.

Analysis of the X-ray diffraction pattern of the fired pellet showed the presence of willemite as the sole crystalline species. Density was determined to be 4.2 g/cc, or 100% of theoretical.

EXAMPLE 20

This is a comparative example not according to the method of our invention, in which the preparation of a willemite dense body is attempted without the use of a sintering aid.

Into a vessel were placed colloidal silica (Ludox (TM), 15.02 g, 33.3 atom % Si), 200 mL deionized water, and zinc oxide (New Jersey Zinc Kadox (TM) 930, 16.27 g, 66.7 atom % Zn). The resultant mixture was homogenized 15 min. using a Janke & Kunkel Ultra-Turrax mixing apparatus. The thus obtained precursor powder was collected by suction filtration and dried at 140° C. the dried powder was subsequently calcined according to the following schedule: 4.5 hr at 30°-300° C., then 1 hr at 300° C.

The calcined powder was ground, sieved (<106 micron mesh) and uniaxially pressed at 10,000 psi into a pellet which was fired according to the following schedule: 1.5 hr at 30°-1000° C., then 12 hr at 1000° C.

Analysis of the X-ray diffraction pattern of the fired pellet showed the presence of zinc oxide and willemite as the crystalline species. Density was determined to be 3.3 g/cc, or 80% of theoretical.

EXAMPLE 21

This example illustrates the preparation of a silica dense body by the method of our invention, with a bismuth sintering aid.

A bismuth stock solution was prepared by dissolving bismuth nitrate pentahydrate ($Bi(NO_3)_3.5H_2O$, 582 g) in concentrated nitric acid (384 mL) and then diluting with water to a final volume of 4 L.

Into a vessel were placed colloidal silica (Ludox (TM), 75.21 g, 95.7 atom % Si), 200 mL deionized water, and 50 mL concentrated ammonium hydroxide. The resultant mixture was homogenized 5 min. using a Janke & Kunkel Ultra-Turrax mixing apparatus. To this mixture were added 75.0 mL of the above bismuth stock solution (4.3 atom % Bi), an action which resulted in the precipitation of the bismuth species onto the silica. The mixture was homogenized for 10 min.

The thus obtained precursor material was collected by suction filtration and dried at 140° C. The dried powder was subsequently calcined to remove residual ammonium nitrate by heating according to the following schedule: 4.5 hr at 30°-300° C., then 1 hr at 300° C.

The calcined powder was ground, sieved (<106 micron mesh), and uniaxially pressed at 10,000 psi into a pellet which was fired according to the following schedule: 1.5 hr at 30°-1100° C., then 12 hr at 1100° C.

Analysis of the x-ray diffraction pattern of the fired pellet showed tridymite (a crystalline silica) and a bismuth silicate ($Bi_2SiO_5$) as the only crystalline species. Density was determined to be 2.51 g/cc, or 98 percent of theoretical.

EXAMPLE 22

This is a comparative example not according to the method of our invention, in which the preparation of a silica dense body is attempted without the use of a sintering aid.

Colloidal silica (Ludox (TM)) was placed in a beaker and dried at 140° C. The resulting powder was ground, sieved (<106 micron mesh) and uniaxially pressed at 10,000 psi into a pellet which was fired according to the following schedule: 1:5 hr at 30°-1100° C., then 12 hr at 1100° C.

Analysis of the X-ray diffraction pattern of the fired pellet showed the presence of cristobalite as the sole crystalline species. Density was determined to be 1.87 g/cc, or 80 percent of theoretical.

What is claimed is:

1. A metal oxide dielectric dense body consisting essentially of
   (I) crystalline grains having a predominant crystalline phase selected from the group consisting of cordierite, magnesium oxide, mullite, mullite-silica, willemite, and silica, and
   (II) between about 1 and about 20 atom % bismuth as bismuth oxide, discontinuously located at the boundaries of the crystalline grains or as inclusions in the crystalline grains, the atom %'s based on the total atoms of bismuth in the bismuth oxide and silicon, magnesium, aluminum, and zinc in the cordierite, magnesium oxide, mullite, mullite-silica, willemite, or silica;

the dense body having a density which is at least 95% of theoretical.

2. A metal oxide dielectric dense body according to claim 1, having a density which is at least 98% of theoretical.

3. A metal oxide dielectric dense body according to claim 1 or 2, wherein the predominant crystalline phase is cordierite having a magnesium oxide/aluminum oxide/silica molar ratio of 2/1.0–3.0/4.0–6.0.

4. A metal oxide dielectric dense body according to claim 3, wherein the molar ratio is 2/1.8–2.2/4.8–5.2 and the amount of bismuth is between about 2 and about 20 atom %.

5. A metal oxide dielectric dense body according to claim 1 or 2, wherein the predominant crystalline phase is magnesium oxide and the amount of bismuth is between about 2 and about 20 atom %.

6. A metal oxide dielectric dense body according to claim 1 or 2, wherein the predominant crystalline phase is mullite having an aluminum oxide/silica molar ratio of 3/1.0–3.0 and the amount of bismuth is between about 5 and about 20 atom %.

7. A metal oxide dielectric dense body according to claim 6, wherein the molar ratio is 3/1.8–2.2.

8. A metal oxide dielectric dense body according to claim 1 or 2, wherein the predominant crystalline phase is mullite-silica having an aluminum oxide/silica molar ratio of 3/1.0–3.0 in the mullite and a mullite-silica molar ratio of 1:3–5.

9. A metal oxide dielectric dense body according to claim 8, wherein the aluminum oxide/silica molar ratio in the mullite is 3/1.8–2.2, the mullite-silica molar ratio is 1/3.5–4.5 and the amount of bismuth is between about 2 and about 20 atom %.

10. A metal oxide dielectric dense body according to claim 1 or 2, wherein the predominant crystalline phase is willemite having a zinc oxide/silica molar ratio of 2/0.5–1.5.

11. A metal oxide dielectric dense body according to claim 10, wherein the molar ratio is 2/0.8–1.2 and the amount of bismuth is between about 2 and about 20 atom %.

12. A metal oxide dielectric dense body according to claim 1 or 2, wherein the predominant crystalline phase is silica.

* * * * *